United States Patent [19]
Brockmeyer et al.

[11] 3,782,563
[45] Jan. 1, 1974

[54] DUMBWAITER LOADING AND UNLOADING APPARATUS

[75] Inventors: Bernard J. Brockmeyer, Normandy; Edward R. Goedeke, Belnor; Malvern A. Schweig, Clayton; William R. Tracy, Kirkwood, all of Mo.

[73] Assignee: Security Fire Door Company, St. Louis, Mo.

[22] Filed: Sept. 13, 1971

[21] Appl. No.: 180,204

Related U.S. Application Data

[63] Continuation of Ser. No. 856,389, Sept. 9, 1969, abandoned.

[52] U.S. Cl........ 214/16.4 R, 214/16.1 CF, 214/730
[51] Int. Cl.............................................. B65g 1/06
[58] Field of Search............... 214/16.1 CF, 16.4 R, 214/16.4 A, 95 R, 730

[56] References Cited
UNITED STATES PATENTS
3,075,659  1/1963  Sylvester et al............... 214/16.4 A
3,036,722  5/1962  Sharaway............................ 214/46
3,237,789  3/1966  Guilbert, Jr..................... 214/16.4 R

*Primary Examiner*—Gerald M. Forlenza
*Assistant Examiner*—Lawrence J. Oresky
*Attorney*—Gravely, Leider & Woodruff

[57] ABSTRACT

A dumbwaiter loading and unloading apparatus employing a motor driven belt unit is mounted on the dumbwaiter platform and arranged to project a carriage outwardly of the platform at a selected landing level. The carriage is provided with a moving belt reversibly driven to cooperate with a worktable stationed at a selected landing level. The worktable is provided with a slave belt that is driven by the belt drive in the dumbwaiter apparatus in a direction to move a load out of the unit onto the worktable or to move the load from the table onto the dumbwaiter apparatus.

6 Claims, 14 Drawing Figures

DUMBWAITER LOADING AND UNLOADING APPARATUS

"This is a continuation of application Ser. No. 856,389 filed Sept. 9, 1969, now abandoned."

BACKGROUND OF THE INVENTION

This invention relates to loading and unloading of dumbwaiters, elevators, lifts, and conveyor apparatus, and is particularly concerned with the art of material handling systems.

Material handling systems have been adapted to a wide variety of applications in industrial and commercial settings. In order to accommodate the systems to the various applications, expensive and complicated apparatus and controls have been devised. A majority of the applications have been in handling materials and articles in general horizontal travel. Simplicity of construction and reliability of operation has not been carried out so that the systems are expensive and not within the reach or needs of certain business and manufacturing operations. This is especially the case with service institutions, such as hospitals and like institutions.

BRIEF DESCRIPTION OF THE INVENTION

The present invention is directed to simple and inexpensive apparatus for loading and unloading articles and the like in a reliable manner and under the control of manual or automatic devices located at a plurality of stations. The apparatus includes a power operated unit that moves along a predetermined path and couples itself to a preselected article supporting means at the several stations spaced along the path.

A preferred form of apparatus is adapted for use with a dumbwaiter system movable to floor levels of a multi-floor institution. The dumbwaiter is provided with a unit on which a belted carriage is movable outwardly of the dumbwaiter shaft to engage the article supporting table. The table is provided with a slave belt that is activated by the carriage belt drive to receive articles or to deliver articles onto the carriage belt. The apparatus is provided with components and parts that will be more particularly set forth and described in the specification to follow.

BRIEF DESCRIPTION OF THE DRAWINGS

In the drawings forming a part of the specification of the apparatus.

DESCRIPTION OF THE DUMBWAITER SYSTEM

Figure 1:
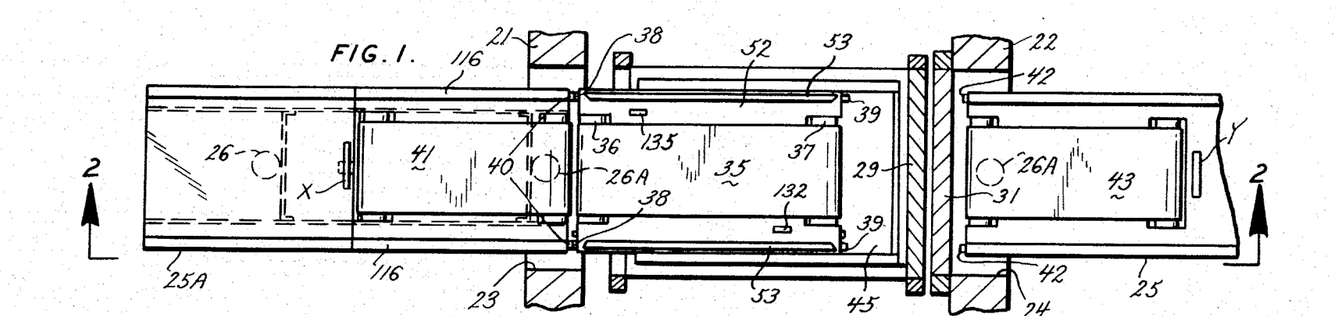
FIG. 1 is a fragmentary plan view of a typical organization of components suitable for a dumbwaiter system.
Figure 2:
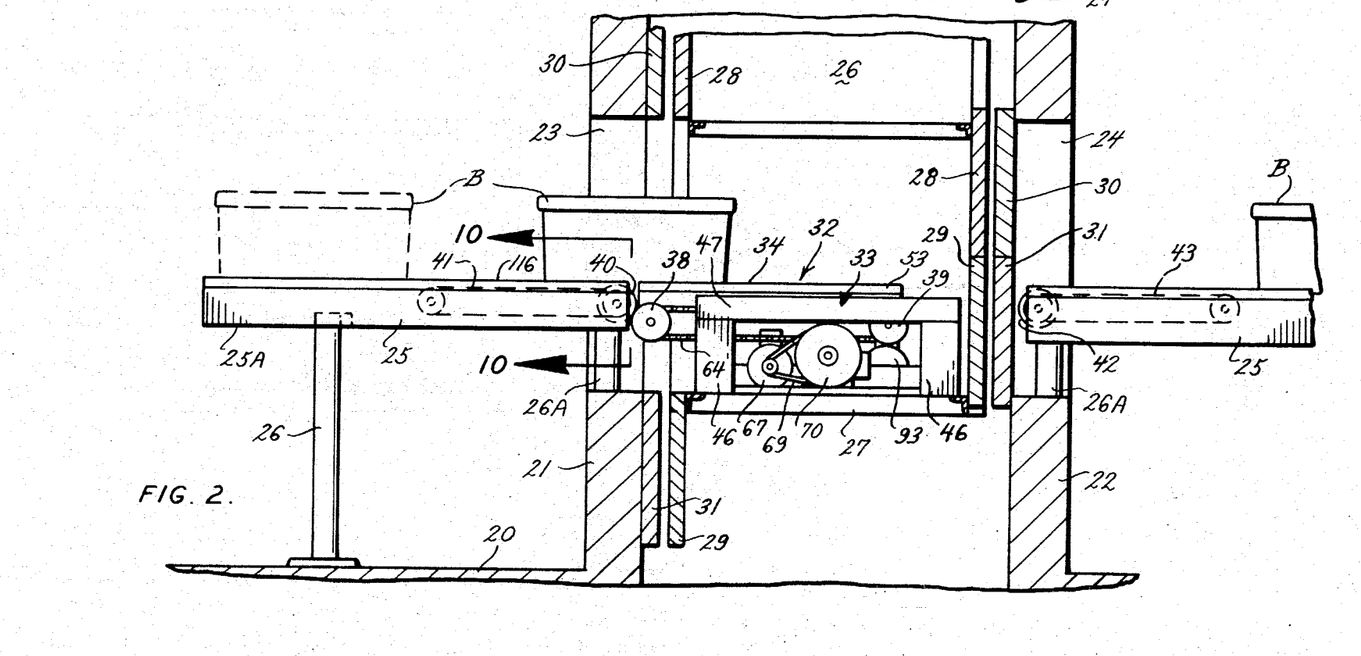
FIG. 2 is a fragmentary sectional view seen at line 2—2 in FIG. 1.

The present apparatus is designed to be used in a multi-level commercial or institutional building and is embodied in a system as is best seen in FIGS. 1 and 2. As there shown, the building is provided with a lower level floor 20 from which rises vertically a dumbwaiter shaft defined by opposite walls 21 and 22 which are in turn provided with access or door openings 23 and 24. The door opening 23 in wall 21 opens outwardly to a service area in which there is positioned a table 25 supported on a suitable column or leg structure 26. The door opening 24 in the opposite wall 22 of the vertical shaft is similarly provided with a table 25, and the tables 25 are located with their upper surfaces in approximately the same plane. The view of FIG. 1 is a plan view of what is shown in FIG. 2 and is intended to show that the door openings 23 and 24 in the respective walls 21 and 22 of the elevator shaft open to service areas on either side of the shaft column and that the floor 20 can be representative of any floor of a multi-floor structure.

The walls 21 and 22 enclose a dumbwairter elevator car 26 which has a lower platform 27 and bi-parting closure gates 28 and 29. The gates 28 and 29 at the lefthand side adjacent to the door opening 23 are shown in the open position and the gates 28 and 29 at the righthand side adjacent to the door opening 24 are shown in the closed position. In addition, the dumbwaiter shaft itself is provided with bi-parting doors 30 and 31, and again the doors 20 and 31 at the lefthand side are shown in the open position so that the door opening 23 is fully open for access to the dumbwaiter car 26. The opposite doors 30 and 31 are shown in a position to close the door opening 24. The shaft doors 30 and 31 are set inside the dumbwaiter shaft so that the work-supporting tables 25 have ends which are partially set within the door openings 23 and 24 for a purpose which will appear presently.

The floor 27 of the dumbwaiter carriage 26 supports the loading and unloading apparatus 32 which, with the work supporting tables 25, constitutes the principle structure of this invention. Briefly, the apparatus includes a stationary frame 33 mounted on the floor 27 and a movable carriage 34 which is operable to move out of the frame 33 to the right or the left as is desired so that the carriage can line up with the adjacent ends of the work supporting tables 25. The apparatus is particularly intended to handle tote boxes which are shown at B in FIG. 2. These boxes may be formed of suitable plastic or other material so as to be durable and yet of sufficient lightweight construction to handle objects that may be placed in boxes for easy transportation throughout a system in commercial, industrial, institutional or other buildings in which the present invention may be installed.

As may be seen in FIGS. 1 and 2, the car 26 supports a carriage 34 which is provided with a motor driven belt 35 trained over suitable pulleys 36 and 37 at the respective ends. The motor which drives the belt 35 is also arranged to drive friction rollers 38 and 39 mounted in the carriage 34. The friction rollers 38 protrude forwardly of the leading edge of the carriage 34 when it is moved leftwardly as shown in FIGS. 1 and 2 and these friction rollers engage with slave friction rollers 40 mounted on the adjacent work supporting table 25. The slave rollers 40 drive a slave belt 41, and because of the physical position of the respective rollers 38 and 40 the belt 41 will move in the same direction as the belt 35, so that a tote box B moved leftwardly from the carriage 34 will be transferred onto the work supporting table 25 by the belt 41 so as to clear the dumbwaiter shaft door opening 23. In a similar manner the righthand friction rollers 39 on the carriage 34 are intended to engage friction rollers 42 at the adjacent end of the worktable 25 in the door opening 24 when the carriage 34 is moved rightwardly. This has the intended action of driving a slave belt 43 on the worktable 25 so that a tote box B will be transferred in the same direction as the belt 35 is driven. Thus, the carriage 34 can move out toward either of the work supporting tables 24, and the carriage belt 35 may be driven in such a direction that a tote box B on either of the belts 41 or 43 will be moved onto the carriage belt 35. The reverse action is, of course, obvious.

In the system shown in fragmentary plan and elevational views in FIGS. 1 and 2 it is, of course, understood that the worktables 25 may be stationed at each of the dumbwaiter access door openings 23 and 24 at the several floors in a building.

DESCRIPTION OF THE LOADING AND UNLOADING APPARATUS

Reference will now be made principally to FIGS. 3, 4, 5, 7 and 9 for a description of the apparatus 32 mounted on the dumbwaiter floor 27. It is understood that only the essential structure and operating components will be particularly pointed out and described.

Figures 4, 5, 6:
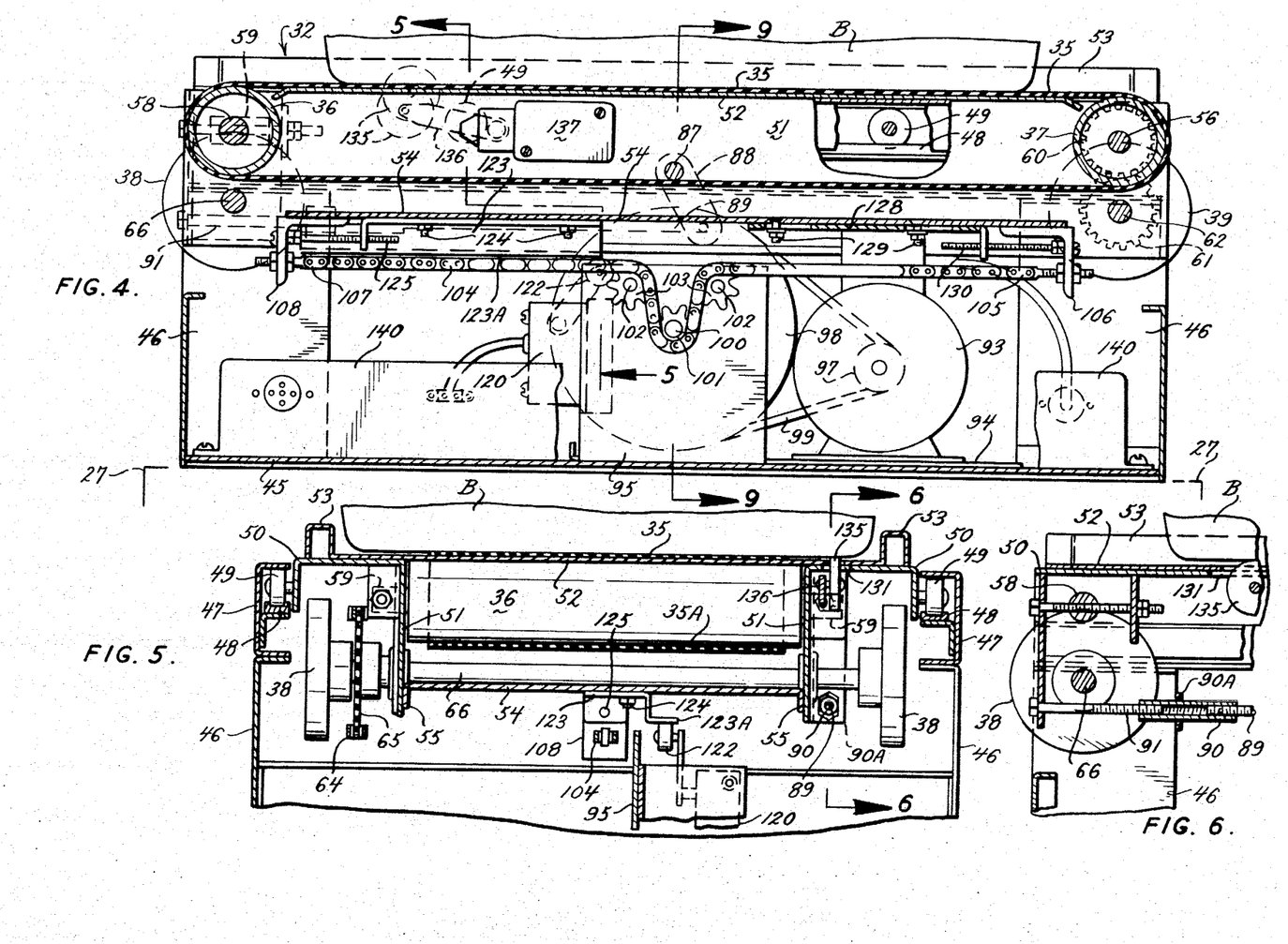
FIG. 4 is a sectional elevational view of the dumbwaiter loading and unloading apparatus, the view being taken along line 4—4 in FIG. 3.
FIG. 5 is a fragmentary transverse sectional view taken along line 5—5 in FIG. 4.
FIG. 6 is a further fragmentary sectional view as seen at line 6—6 in FIG. 5.
Figure 7:
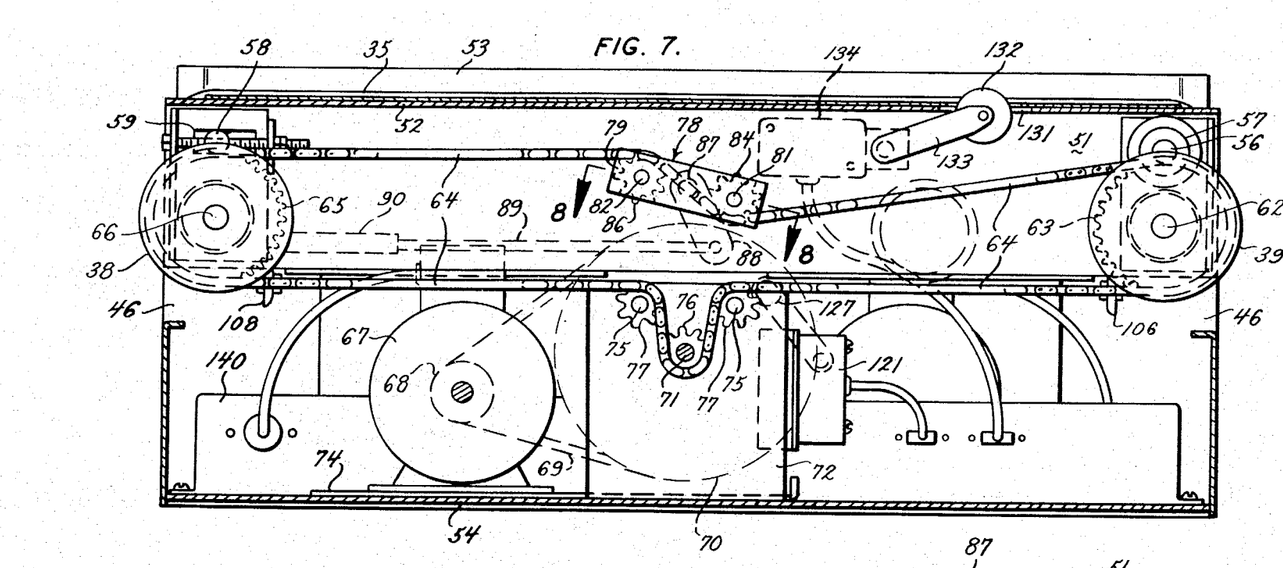
FIG. 7 is a further longitudinal sectional elevational view, similar to FIG. 4, but taken along line 7—7 in FIG. 3.
Figure 8:
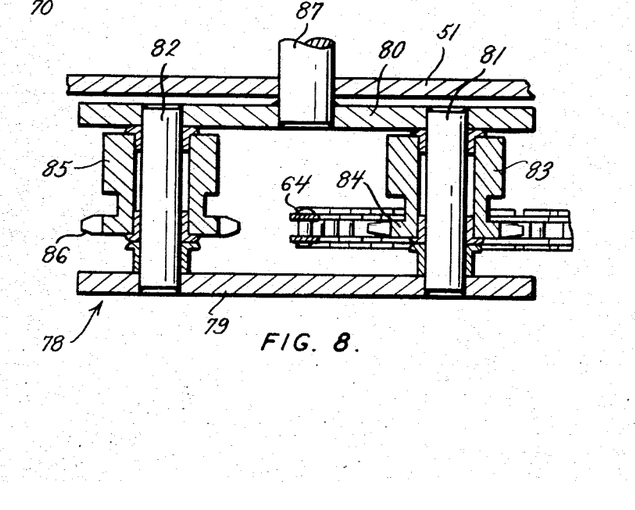
FIG. 8 is a greatly enlarged fragmentary plan view of the drive chain slack compensator, the view being taken at line 8—8 in FIG. 7.
Figure 9:
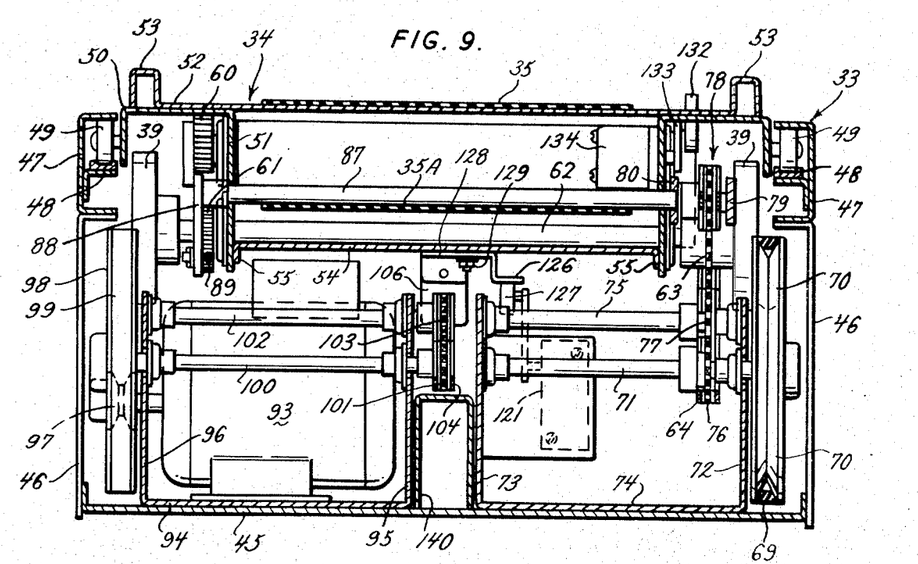
FIG. 9 is a transverse sectional elevational view taken at line 9—9 in FIG. 4.

The frame for the apparatus may best be seen in FIGS. 4, 7 and 9 and these views include a floor plate 45 which extends the full length of the assembly, pairs of opposite vertical sidewalls 46 which also extend a short distance lengthwise of the assembly, and a pair of longitudinal top channels 47 supported by the side walls 46 and carry trackways 48 in which a plurality of suitable rollers 49 are operable. The rollers 49 operably support the frame 50 of the carriage 34. The frame 50 is made in right and left hand parts and those parts provide spaced inner depending flanges 51 which run longitudinally of the assembly for supporting certain of the shaft bearings and other parts for operating components which will be described. The two frames 50 are (FIGS. 4, 5 and 9) interconnected by a top plate 52 formed along its longitudinal outer edges by guard channels 53 so as to define a longitudinal passageway across the top of the carriage 34 for the purpose of keeping the tote boxes B moving in the correct path of travel. The top plate 52 supports the working pass of the belt 35 while the return pass 35a of the belt moves under the top plate 52. Below plate 52 is a horizontal wall 54 attached by flanges 55 to the lower margins of the depending flanges 51.

Figure 3:
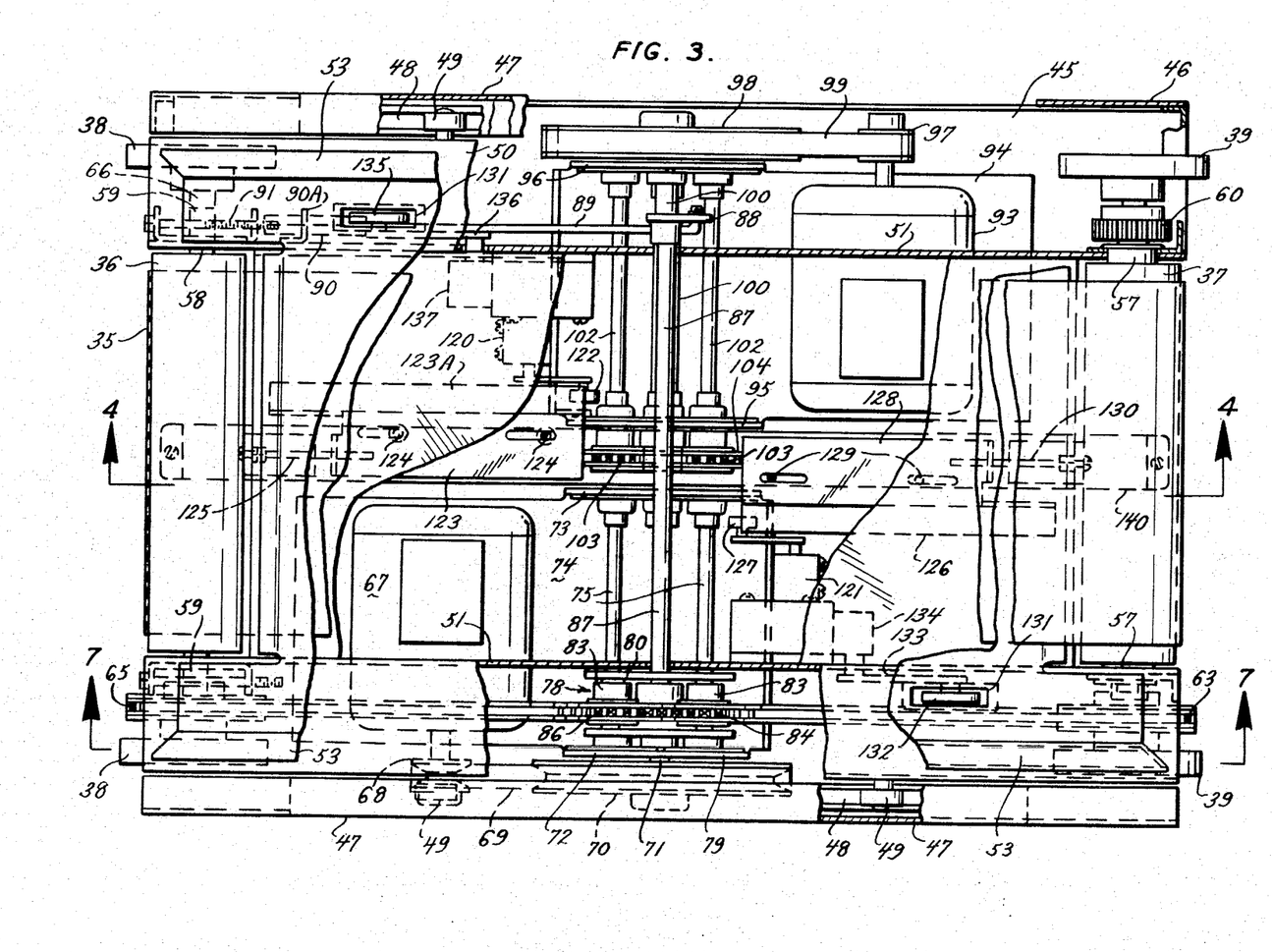
FIG. 3 is an enlarged and partly broken away plan view of the loading and unloading unit mounted on the dumbwaiter seen in FIG. 1.

As may be seen in FIG. 3, the working pass of the belt 35 is trained over a roller 37 at the right end and at the opposite end over a roller 36. The roller 37 has a shaft 56 mounted at its opposite ends in suitable bearings 57 in the respective depending flanges 51 so that its top surface will support the belt 35 on the top plate 52. The lefthand rollers 36 has a shaft 58 which is mounted (FIGS. 4, 6 and 7) by adjustable bearing means 59 carried by the depending flanges 51 to complete the operative support of the belt 35.

As is seen in FIG. 4 the righthand belt driving roller 37 has a gear 60 mounted on the cross shaft 56, which gear meshes with a drive gear 61 on a second cross shaft 62 mounted by suitable bearings in the depending flanges 51 (FIG. 9). The shaft 62 extends beyond flanges 51 and supports the friction rollers 39 before referred to in FIGS. 1 and 2. The belt 35 forms the drive connection from roller 37 to roller 36 and power input to shaft 62 is transmitted to the shaft 56 for roller 37 through meshing gears 60 and 61. As seen in FIG. 7, shaft 62 is provided with a sprocket wheel 63 on which a sprocket chain 64 is engaged, and the opposite end of the chain engages on a second sprocket wheel 65 mounted to drive shaft 66 (FIGS. 5 and 7). The shaft 66 extends across the frame and carries friction wheels 38 at its outboard ends.

The power input to the sprocket chain 64 is best seen in FIGS. 3, 7, 8 and 9. A motor 67 has its pulley 68 connected by belt 69 to a pulley 70 on shaft 71. The shaft 71 is mounted in spaced frame walls 72 and 73 of an upwardly opening U-shaped sub-frame 74 in which motor 67 is mounted. The sub-frame 74 also supports a pair of idler shafts 75 spaced symmetrically (FIG. 7) relative to shaft 71. The shaft 71 carries a power input sprocket 76 about which the chain 64 passes and the shafts 75 carry idler sprockets 77 which retain the chain in a desired condition of wrap on the input sprocket 76. The chain 64 engages the respective sprockets 63 and 65 on shafts 62 and 66, and the top pass of the chain 64 runs through a slack take-up device 78, best seen in FIGS. 3, 4, 7 and 8.

The slack take-up device 78 includes a pair of spaced frame members 79 and 80 which support shafts 81 and 82 so its sprocket 86 engages the return pass of chain 64. Sprocket 84 rides on top of the chain 64 and sprocket 86 rides under the chain. The frame members 79 and 80 are supported on the end of a shaft 87 which extends across the width of the apparatus and through the depending flanges 51 where on the opposite end there is affixed a lever 88. The lever 88 is engaged at its lower end by a link 89 which extends (FIGS. 3 and 7) leftwardly and threadedly engages in an adjusting device 90. The device 90 is slideably mounted but not capable of turning in a bracket 90A, and it is threadedly engaged by an anchor shaft 91 so that by turning the shaft 91 the link 89 can be actuated to swing the lever 88 for adjusting the slack in the chain 64.

The carriage 34 for the belt 35 is movable on rollers 49 in tracks 48 so it can be projected outwardly of the opposite ends of the frame 33 that is fixed to the platform 27 of the dumbwaiter. The longitudinal movement of the carriage 34 is obtained by motor 93 (FIG. 3) disposed adjacent an upwardly opening U-shaped sub-frame 94 having side walls 95 and 96. The motor pulley 97 is connected to pulley 98 by a suitable belt 99 and drives shaft 100 operably mounted in the walls 95 and 96. The shaft 100 extends through wall 95 and carries a sprocket 101 thereon in the central space between walls 73 and 95 (FIG. 9). A pair of idler shafts 102 are supported above and to each side of the main shaft 100 (FIGS. 4 and 9) in walls 94 and 95, and each shaft carries an idler sprocket 103. A carriage drive chain 104 is trained under the sprocket 101 and over sprockets 102. One end (right end as seen in FIG. 4) 105 of the chain 104 is anchored at a bracket 106 carried under the horizontal wall 54 of the carriage 34. The opposite end 107 of the chain 104 is anchored at a like bracket 108 fixed to the wall 54. Rotation of the sprocket 101 in reverse directions will exert its driving force on the chain 104 and move the carriage 54 in directions determined by the motor direction.

It can now be appreciated that the motor 93 drives chain 104 in a selected direction to move the carriage 34 left or right toward either of the tables 25 (FIG. 1 and 2). The motor 67, on the other hand, drives the belt 35 in a selected direction to move tote boxes B relative to the frame 33. Simultaneously, the motor drives shafts 62 and 66 (FIGS. 4 and 7) upon the outer end portions of which are mounted friction rollers 39 and 38 respectively.

For example, when the belt 35 (FIGS. 1, 2 and 4) is driven to move boxes B leftwardly the shafts 62 and 66 must be driven in a clockwise direction in order to rotate the belt shafts 56 and 58 through the gears 60 and 61 in a counter-clockwise direction. This operation drives friction rollers 38 in the clockwise direction such that upon engagement of rollers 38 with the friction rollers 40 on the lefthand table 25, the belt 41 (FIG. 2) is driven leftwardly to move the box B leftwardly onto table 25. This is a box unloading operation. When moving box B from table 25 onto the carriage belt 35 for loading, the shafts 62 and 66 are rotated in a counter-clockwise direction so that, through the direction reversing gears 60 and 61, the carriage belt 35 is moved rightwardly at the same time the carriage 34 is moved leftwardly toward table 25 to engage friction rollers 38 and 40 for driving table belt 41 rightwardly. Thus, a box B is loaded onto the carriage belt 35. During this operation of belts 35 and 41 the carriage motor 93 is driven in the appropriate direction to move the carriage 34 out toward the lefthand table 25 and then it is reversed to move the carriage back into the frame 33 on the dumbwaiter floor 27. Of course, by selecting the direction of drive for motor 93 the carriage 34 may be moved left or right, and by selecting the direction of drive for motor 67 the belt 35 can be driven either left or right while the friction rollers 38 and 39 are rotated in an opposite hand to the belt movement because of the gears 60 and 61.

THE WORK SUPPORTING TABLES

As heretofore referred to in describing FIGS. 1 and 2, each dumbwaiter shaft door opening 23 and 24 is provided with a work (boxes) supporting table 25 supported at a desired elevation off the floor 20 by a leg structure 26. Each such table 25 has a slave belt operably mounted thereon such that the belts form continuations of the carriage belt 35. While a slave belt 41 or 43 is shown on tables 25 in the drawing, it should be understood that other means can be employed, such as live rollers, gravity rollers, or equivalent load supporting conveyor means. Legs 26A at the shaft ends of the tables 25 serve to support the belts 41 and 43 at the desired alignment of belt 35 with belts 41 and 43.

Figure 10:
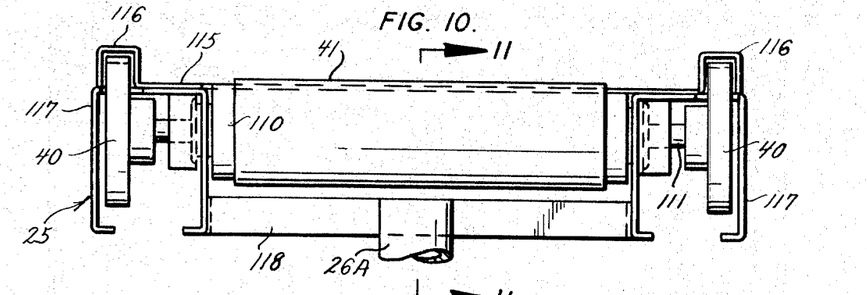
FIG. 10 is a greatly enlarged fragmentary elevational view taken at line 10—10 in FIG. 2.
Figure 11:
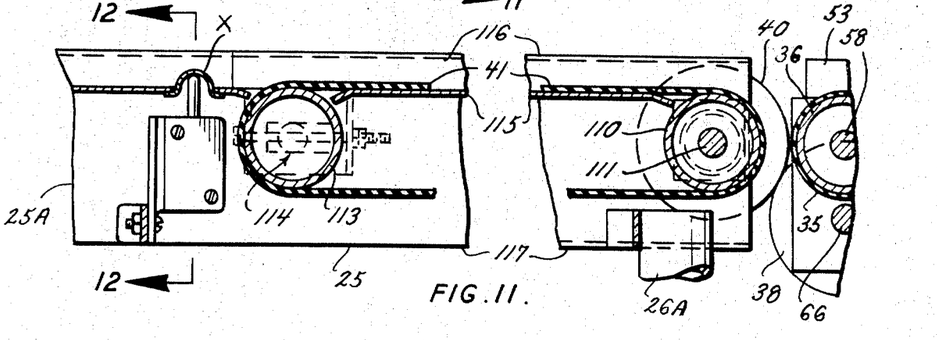
FIG. 11 is a fragmentary and fore-shortened sectional elevational view taken at line 11—11 in FIG. 10.
Figure 12:
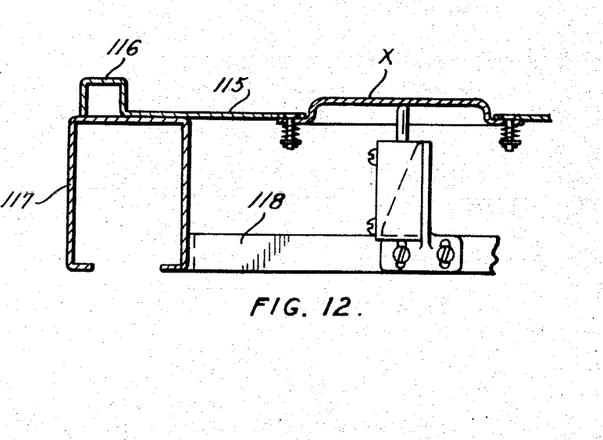
FIG. 12 is a fragmentary sectional detailed view as seen at line 12—12 in FIG. 11.

Belt 41 (FIGS. 10 and 11) is trained over roller 110 carried on shaft 111. The outer ends of shaft 111 carry the slave friction rollers 40 so that the rollers 40 can drive the belt 41 in the same direction of rotation. The opposite end of belt 41 is trained about roller 113 carried on a shaft that is adjustably mounted in the table frame by means 114. The span of the belt 41 between rollers 110 and 113 is supported on a surface 115, and the longitudinal edges of the surface 115 are flanked by guide members 116. The table 25 comprises longitudinal box beams 117 and suitable cross members 118. The belt supporting portion of each table 25 may be provided with an outboard portion 25A which does not have a slave belt, whereby boxes B can be temporarily stored waiting pick-up to remove the same by the dumbwaiter or waiting distribution on the floor.

What has been described for the lefthand table 25 is equally applicable to the belt 43 on the righthand table 25 of FIGS. 1 and 2.

THE CARRIAGE CONTROL SYSTEM

The carriage 34, driven by motor 93, is permitted to project a suitable distance so that the friction rollers 38 and 39 are held against the table slave rollers 40 or 42 respectively, and this contact is maintained during the transfer operation. The outward travel of the carriage 34 is limited by contact between rollers 38 and 40 or rollers 39 and 42. The return and centering subject to the location of limit switches 120 and 121, switch 120 (FIGS. 3, 4 and 5) being located near the shafts 101 and 102 such that its actuating roller 122 is in the line of travel of an actuator cam 123. The slide plate 123A is adjusted by a threaded stem 125 accessible (FIG. 3) from the left end of the carriage 34. A similar cam 126 (FIG. 9) is provided to actuate the roller 127 for switch 121. The cam 126 projects down from a slide plate 128 that is adjustably connected to the under side of wall 54 by a pair of mounting means 129 received in slots in the plate. A threaded stem 130 (FIG. 3) engages the plate and is accessible from the right end of carriage 34.

When the carriage 34 moves leftwardly in returning toward a centering position the cam roller 122 of limit switch 120 will eventually ride off the right end of the cam 123 and stop motor 93. Similarly, when the carriage 34 moves rightwardly, the cam roller 127 will eventually ride off the left end of the cam 126 and stop motor 93.

THE CONTROL SYSTEM

It can be seen in FIG. 1 that the upper surface of the carriage, particularly the carriage top wall 52 is formed with spaced apertures 131 that are on opposite sides of the belt travel and near opposite ends of the carriage. The distance between the apertures 131 is slightly less than the length of the boxes B to be handled.

The aperture 131 (FIGS. 3, 7 and 9) near the right end of the carriage 34 receives a depressable roller 132 on the end of a feeler arm 133 for actuating a limit switch 134. Similarly (FIGS. 3 and 4) the left aperture 131 receives a depressable roller 135 on the end of a feeler arm 136 for actuating a limit switch 137. The rollers 132 and 135 project above the top surface of the wall 52 and above the belt 35 so that both will be engaged by the bottom of a centered box. The depressing of a roller 132 or 135 will control the motor 67 to stop belt 35, whereby a box B can be quickly brought into a centered position on the carriage 34.

Figures 13, 14:
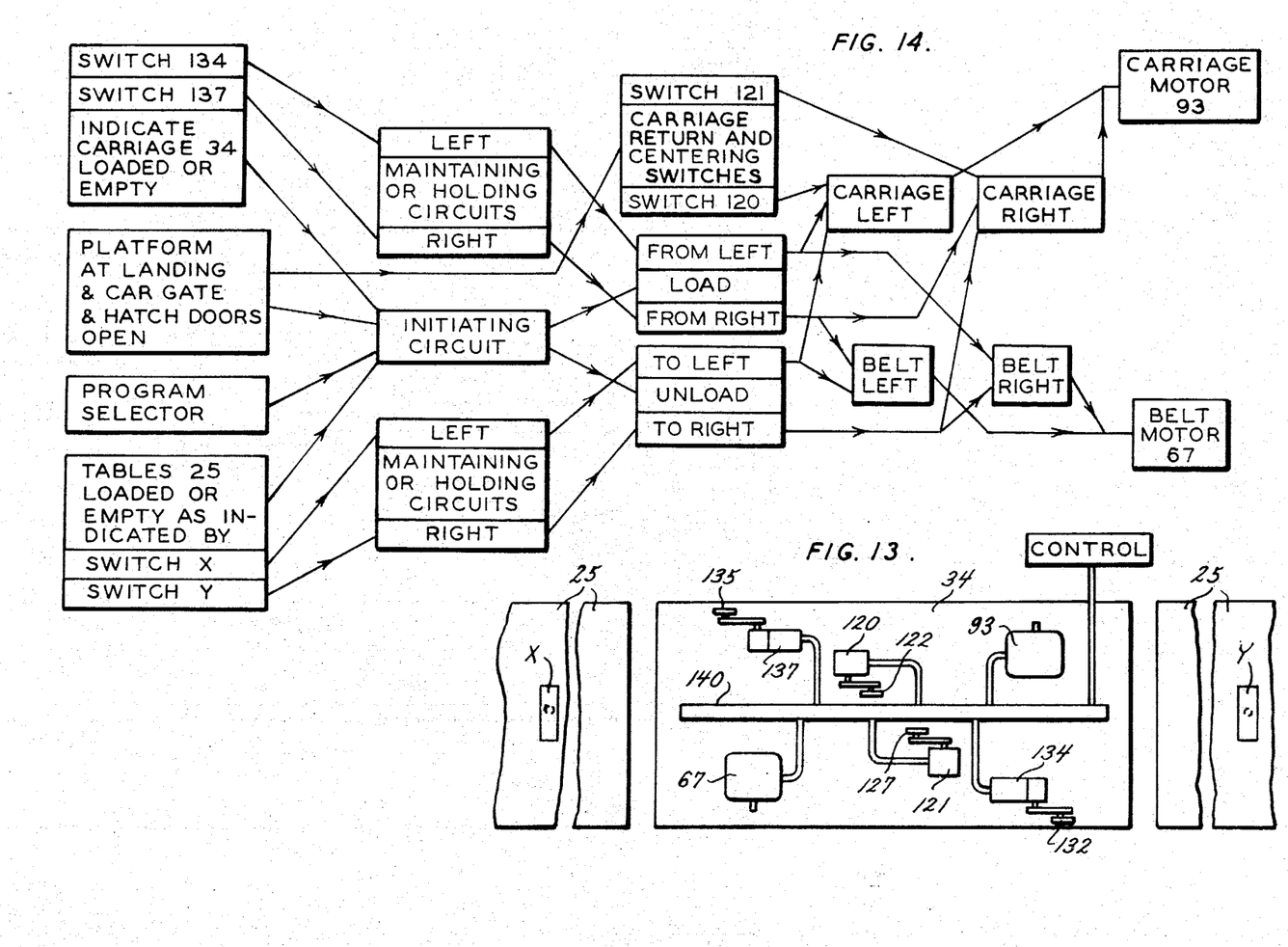
FIG. 13 is a fragmentary diagram of the electrical components for the present apparatus schematically arranged on the carriage and tables.
FIG. 14 is a block wiring diagram of the preferred circuit arrangement for the apparatus of this invention.

Turning now to FIGS. 13 and 14, and to other appropriate views in the drawings, it is seen that tables 25 are provided with switches X and Y (FIGS. 1, 11, 12 and 13) and the carriage 34 carries switches 134 and 137. These switches perform dual functions as will presently appear. Switch X is connected into a circuit (FIG. 14) which initiates a box loading operation from the lefthand table 25 and also serves as a stopping means in the holding circuit during a box unloading operation to the left. Switch Y forms an element of the initiating circuit during a box loading operation from the righthand table 25 and also serves as a stopping means in the holding circuit during a box unloading operation to the right.

Switches 134 and 137 are connected into the initiating circuit for an unloading operation either to the right or to the left. Also, switch 134 is a stopping element in the holding circuit during a load operation from the left. Similarly switch 137 is a stopping element in the holding circuit during a load operation from the right.

Switches 120 and 121 in conjunction with the respective cams 123 and 126 (FIG. 3) are operative to return and center carriage 34 in the frame 33. When the carriage moves to the left cam 126 actuates the switch 121 through roller 127 so that when the carriage movement to the left is completed, the carriage will automatically move back to the right to a centered position where the cam 126 runs off roller 127 of switch 121. Similarly, when the carriage 34 moves to the right cam 123 will actuate the switch 120 through roller 122 so that when the movement is completed the carriage 34 will automatically move back to the left to a centered position where the cam 123 runs off roller 122 for switch 120. Thus, when the carriage is centered the cams 123 and 126 are out of contact with the respective switch rollers 122 and 127.

The control circuits for carriage left and carriage right movement (FIG. 14) are both electrically and mechanically interlocked as are the control circuits for the belts left and belt right movement.

THE LOADING OPERATION

With the dumbwaiter car 26 positioned at a preselected landing, with the left hand car gate 28–29 and hatch door 30–31 open, with no box B on the carriage 34 to depress rollers 132 and 135 of switches 134 and 137 respectively, and with a box B on the lefthand table 25 to depress switch X, an initiating circuit is set up to load the box B from the left. Once the circuit is energized the motor 93 will drive the carriage 34 to the left and will also energize motor 67 to drive the carriage belt 35 to the right. Simultaneously, the load from the left circuit becomes self-holding through the left maintaining circuit under control of switch 134. As the carriage 34 starts its movement to the left, cam 126 closes switch 121 which sets up the carriage return and centering circuit. The carriage 34 moves out to the left with its belt 35 driven to the right. This action rotates friction rollers 38 in a counter-clockwise direction. As the friction rollers 38 engage the slave friction rollers 40 on the left table 25, table belt 41 will be driven to the right to move the box B onto the belt 35 which then completes the loading of the box B onto carriage 34. Thus, box B will move rightwardly until it depresses roller 132 for switch 134 which deactivates the left maintaining circuit which, in turn, deactivates the load from the left circuit. Thus, the left drive of motor 93 and the right drive of motor 67 are deactivated. As the carriage left circuit is deactivated it allows the carriage return circuit, previously set up through switch 121, to energize the motor 93 to drive the carriage 34 rightwardly. The carriage 34 then returns into the frame 33 until cam 126 releases roller 127 for switch 121, at which event the carriage will be substantially centered in the frame 33.

Similarly, with a box B on the righthand table 25 to depress switch Y, and with no box on the carriage 34 to depress rollers 132 and 135 for the respective switches 134 and 137, an initiating circuit is set up to load the box B from the right table 25. This circuit energizes motor 93 to drive the carriage 34 rightwardly and energizes motor 67 to drive the carriage belt 35 leftwardly. At this time, the load from the right maintaining circuits are set up under control of switch 137. As the carriage 35 begins to move to the right, cam 123 activates switch 120 by depressing the switch roller 122 to set up the return circuit through switch 120. Thus, the carriage 34 moves to the right and belt 35 moves to the left which rotates the friction rollers 39 in a clockwise direction. As friction rollers 39 contact slave friction rollers 42 on the right table 25, the table belt 43 is driven leftwardly to move the box B onto the carriage belt 35. The loading of the box B onto belt 35 will depress roller 135 of switch 137, and this action deactivates the maintaining right circuit which, in turn, deactivates the load from the right circuit to stop motors 93 and 67. Deactivation of the right circuit allows the carriage return circuit to become active and the carriage 34 is driven by motor 93 to the left for return into the frame 33 until cam 123 runs off the roller 122 for switch 120 as the carriage reaches its centered or near centered position. Of course, for right loading the right hand car gate 28 and 29 and hatch door 30 and 31 must be open.

THE UNLOADING OPERATION

The unloading operation is as follows: with the dumbwaiter 26 at a preselected landing and the gate 28–29 and hatch door 30–31 open, with switch rollers 132 and 135 depressed by a box B on carriage 34, and with no box B on the left table 25 to activate switch X, an initiating circuit is set up to unload the box B to the left table 25. This activates the carriage motor 93 to drive the carriage to the left and activates the motor 67 to drive the belt 35 to the left.

Simultaneously, the left maintaining circuits are set up subject to switch X, and as the carriage 34 moves out to the left cam 126 activates switch 121 by depressing roller 127 to set up the carriage return and centering circuit through switch 121. In this leftward movement of the carriage and belt 35 thereon, the friction rollers 38 will rotate clockwise to contact and drive slave friction rollers 40 on the left table 25. The table belt 41 drives to the left to pull the box B onto the left table 25 until switch X is contacted.

Actuation of switch X deactivates the left maintaining circuit which, in turn, deactivates the unload to the left circuit. The motors 93 and 67 are stopped and motor 93 is reversed to drive the carriage 34 to the right to return it to the frame 33. Cam 126 eventaully runs off roller 127 of switch 121 to deactivate the motor 93 when the carriage 34 is in or near its centered position.

similarly, when a box B is on carriage 34, it depresses rollers 132 and 135 to activate switches 134 and 137 respectively. As no box is on the righthand table 25, and the righthand gate 28-29 and door 30-31 are in open position, an initiating circuit is set up to unload the box B to the right. This condition activates the carriage motor 93 to drive the carriage to the right and activates motor 67 to drive the carriage belt 35 to the right. Simultaneously, the right maintaining or holding circuits are set up through switch Y.

When the carriage 34 moves to the right its cam 123 depresses roller 122 to activate switch 120 and set up the carriage return circuit. During this movement the belt 35 moves to the right and drives friction rollers 39 counter-clockwise so that upon contact with the slave friction rollers 42 on the right table the belt 43 on that table is driven to the right. Thus, the box B is transferred onto the right table 25 until it activates switch Y. This action deactivates the right maintaining circuits which, in turn, deactivates the unload to the right circuit so the motors 93 and 67 are stopped and motor 93 is reversed to drive the carriage 34 back into frame 33. The return movement of the carriage causes cam 123 to release the roller 122 for switch 120 which stops motor 93 with the carriage in or near its centered position.

The foregoing disclosure has reference to a presently preferred embodiment of the invention, but it is understood that modifications are to be included. It is to be understood that the block wiring diagram of FIGS. 14 sets forth, without reference characters, but with appropriate legends, a suitable wiring circuit arrangement. The circuit connections, per se, are not specifically noted, but the same are embodied in an elongated casing 140 which is located (FIGS. 3, 4, 7, 9 and 13) to extend longitudinally of and near the center of frame 33.

We claim:

1. In load transfer apparatus, the combination which includes: an elongated frame, an elongated carriage initially centered in said frame and movably supported by said frame for movement longitudinally relative to said frame, a first load supporting surface operably mounted on said carriage, first motor means supported by said frame and operably connected to drive said first load supporting surface relative to said carriage, first drive means on said carriage rotatably driven by said motor means, a second load supporting surface operably disposed in axial alignment with said elongated frame and spaced therefrom, slave drive means operably connected to said second load supporting surface to drive the latter, and second motor means supported by said frame and operably connected to drive said carriage relative to said frame to bring said first drive means into driving contact with said slave drive means whereby said first motor means effects simultaneous driving operation of said first and second load supporting surfaces, said first and second motor means being reversible to effect transfer of loads selectively between said first and second load supporting surfaces, a control circuit operably connected to said first and second motor means to effect reversible operation thereof, load responsive switch means connected into said control circuit and disposed in the path of a load receiving area on said first and second load supporting surfaces to determine the operation of said first and second motor means, and other control means in said control circuit responsive to movement of said carriage out of said centered position in said frame to return said carriage toward said centered position.

2. In dumbwaiter service apparatus, the combination which includes: a frame on the dumbwaiter providing trackways; a carriage supported on and movable along said trackways; first power means operably connected to said carriage to move the same in opposite directions from a first position substantially centered in said frame to a second position having an end thereof extended from one end of said frame; load moving means operably carried by and adapted to move a load relative to said carriage; second power means operably connected to said load moving means to effect movement of a load therein; drive means operably disposed adjacent the end of said carriage, said drive means being included in said second power means; dumbwaiter service means spaced from said end of said frame and having a load supporting and moving surface thereon; and slave means operably mounted on said service means to drive said surface, said slave means being disposed in position to be engaged by said drive means on said carriage upon carriage movement into said second position; first control means on said frame and carriage cooperatively positioned and operable upon carriage movement to said second position to return said carriage to said first position; and second control means on said service means operably connected to said first control means to set up carriage return operation.

3. The dumbwaiter service apparatus of claim 2 wherein said first and second control means are responsive to the presence of a load.

4. In vertically movable load transporters such as dumbwaiters and elevators, the combination of a vertically movable dumbwaiter car, load transfer apparatus which comprises a stationary table adjacent a loading and unloading position for said car, said table having a load receiving and discharge end spaced from the path of vertical movement of said car, first load moving means operable on said table to move the load over said end, first friction wheel means operably connected to said load moving means on said table to rotate and effect load movement relative to said table, a frame carried on the vertically movable car and spaced a predetermined substantially fixed distance from said table end, carriage means operable on said frame to move in a direction toward and away from said table end to bridge the space between said table and frame, means on said frame and carriage to guide the movement of said carriage along a path assuring alignment of said carriage and tables, second load moving means operable on said carriage to move the load relative thereto, second friction wheel means on said carriage operably connected to said second load moving means, said first and second friction wheel means respectively on said table and carriage being positioned to abut each other by friction contact, the direction of rotation of one of said friction wheel means determining the concurrent direction of operation of said first and second load moving means respectively on said table and carriage for transferring a load therebetween across the space between said table and spaced frame, first reversible motor means operably connected to one of said first and second load moving means to effect a load transfer, and second reversible motor means operably connected to said carriage to effect movement thereof, said second motor means selectively maintaining and breaking said abutment between said first and second friction wheel means and also serving in a power on stalled condition as the only means to maintain positive contact pressure between said first and second friction wheel means sufficient to accomplish load transfer, said power-on condition being maintained until completion of said load transfer.

5. In elevator loading and unloading apparatus, a vertically movable elevator car, a frame on said car having track ways therein, said car frame being positionable selectively at any of several elevations by the elevator car, a carriage operably mounted on said track ways and guided thereby to move between a first position substantially centered in said frame and a second position having an end portion extending outwardly in cantilevered position, first load moving means operably carried by said carriage, first friction wheel means on said carriage adjacent said end portion and operably connected to said first load moving means, a load supporting table located at certain of the frame elevations, said table having one end spaced a substantially fixed distance from said first position of said carriage, second load moving means operably carried by said table and substantially aligned with said first load moving means, said first load moving means being positionable by said frame of the elevator in substantially the same plane with said second load moving means, thereby forming a continuation of each other, second friction wheel means on said table adjacent said one end and operably connected to said second load moving means, said first friction wheel means being engageable with said second friction wheel means in said second carriage position, means in said frame supplying power to drive said first load moving means and first friction wheel means concurrently, said first friction wheel means driving said second friction wheel means whereby said first and second load moving means move in the same direction to move the loads therebetween, and other power means operably connected to said carriage to move the same between said first and second positions and said other power means serving in a power-on stalled condition as the only means to maintain said friction wheel means in sufficient engagement to effect rotation to accomplish load transfer when in said second position, said power-on condition being maintained until completion of said load transfer.

6. In load transfer apparatus, the improvement which includes a stationary load supporting table, first load moving means on said table, friction wheel means on said table operably connected to said load moving means to drive the means selectively to move a load onto and off of the table, a load transporter movable along a path perpendicular to the direction of movement of said load moving means and spaced from said table, a load transfer carriage operable on said transporter to extend to a position across the space between said table and transporter, second load moving means on said carriage, drive wheel means on said carriage operable to drive said second load moving means simultaneously with load transfer operation of said carriage, said drive wheel means on said carriage being aligned by said carriage in said extended position to engage said friction wheel means on said table and determine the direction of said first load moving means to coincide with the direction of movement of said second load moving means on said load transfer carriage, motor means connected to said carriage to drive said carriage into and withdraw said carriage from the extended position, and control means for said motor means to cause said motor means to serve by means of a power on stalled condition as the only means to hold said drive and friction wheels engaged during load transfer, said power-on condition being maintained until completion of said load transfer.

* * * * *